US012664181B2

(12) United States Patent
Montgomery et al.

(10) Patent No.: US 12,664,181 B2
(45) Date of Patent: Jun. 23, 2026

(54) SYSTEM AND METHOD FOR ARTIFICIAL INTELLIGENCE ASSISTED PROCESSING OF LEGAL RESEARCH QUERIES

(71) Applicants: Joshua James Montgomery, White Plains, NY (US); Connor Patrick Jennings, Des Moines, IA (US); Brandon Kiefer, Ankeny, IA (US)

(72) Inventors: Joshua James Montgomery, White Plains, NY (US); Connor Patrick Jennings, Des Moines, IA (US); Brandon Kiefer, Ankeny, IA (US)

( * ) Notice: Subject to any disclaimer, the term of this patent is extended or adjusted under 35 U.S.C. 154(b) by 144 days.

(21) Appl. No.: 18/799,345

(22) Filed: Aug. 9, 2024

(65) Prior Publication Data

US 2026/0044536 A1    Feb. 12, 2026

(51) Int. Cl.
| | |
|---|---|
| *G06F 16/332* | (2025.01) |
| *G06F 16/3332* | (2025.01) |
| *G06F 40/284* | (2020.01) |
| *G06Q 50/18* | (2012.01) |

(52) U.S. Cl.
CPC ...... *G06F 16/3323* (2019.01); *G06F 16/3334* (2019.01); *G06F 40/284* (2020.01); *G06Q 50/18* (2013.01)

(58) Field of Classification Search
CPC ............. G06F 16/3323; G06F 16/3334; G06F 40/284; G06Q 50/18
See application file for complete search history.

(56) References Cited

U.S. PATENT DOCUMENTS

| | | | |
|---|---|---|---|
| 11,860,914 B1* | 1/2024 | Qadrud-Din | .......... G06F 40/289 |
| 11,995,411 B1* | 5/2024 | Qadrud-Din | ........... G06N 3/045 |
| 2024/0184974 A1* | 6/2024 | Burris | ..................... G06F 16/35 |
| 2024/0232240 A9* | 7/2024 | Okerlund | ............... G06N 20/00 |
| 2024/0242037 A1* | 7/2024 | Heller | ................... G06F 40/289 |

* cited by examiner

*Primary Examiner* — Yogeshkumar Patel

(57) ABSTRACT

A computer-implemented system is disclosed which enhances legal research by utilizing a first user interface (UI) to receive search criteria as text prompts from users, which are then processed by an application program interface (API) across an electronic connection. The system includes an instruction base for expanding the prompts into snippets for a machine learning network, which defines the legal database searches. The process further refines the prompts through a transformation module, breaking down and tagging the text for compatibility with the machine learning network. Coupled with non-transitory computer memory, the system efficiently outputs results in response to the applied search criteria. A second interactive UI displays these results and allows for user interaction to delve into detailed information, optimizing the legal information retrieval process. Also disclosed is a method for processing legal research queries enhanced by a machine learning network.

20 Claims, 5 Drawing Sheets

400

305

401 Tokenization

402 Vectorization

403 Sequence Formation

404 Dimensionality and Padding

405 Normalization (Optional)

SYSTEM AND METHOD FOR ARTIFICIAL INTELLIGENCE ASSISTED PROCESSING OF LEGAL RESEARCH QUERIES

FIELD OF THE DISCLOSURE

The present disclosure relates in general to legal information retrieval technologies, and in particular to a computer-implemented system and method for processing legal research queries through a dynamic user interface and leveraging artificial intelligence with large language models to enhance search accuracy and efficiency in a legal database context.

BACKGROUND OF THE DISCLOSURE

The field of legal research has undergone significant transformation with the introduction of computer-assisted research tools. Traditionally, legal research was a labor-intensive process, requiring a deep dive into physical case reporters, digests, and other legal tomes. In recent decades, the digital revolution has brought forth an array of legal search engines and databases designed to streamline the research process. These tools, relying on keyword searches and Boolean logic, have significantly reduced the time and resources expended on legal research, but they also presented new challenges.

One of the main advancements in the realm of legal research has been the application of artificial intelligence (AI) and machine learning technology. With these advancements, legal research tools have begun to address some of the complexities inherent in understanding and interpreting the nuances of legal language, case relevance, and jurisdictional variances. AI-driven systems can now provide more contextual and sophisticated search capabilities than the simple keyword-based approaches of traditional search engines. Machine learning algorithms, through pattern recognition and learning user preferences, can enhance search result accuracy and relevance over time.

Despite these advancements, prior computer legal research tools still suffer from several deficiencies. One main issue is the reliance on the user's ability to construct effective search queries. Traditional search systems often require specific syntax and a clear understanding of the legal concepts involved to yield relevant results. This limitation can be burdensome for less experienced users or those unfamiliar with the intricacies of legal search terms and connectors.

Another significant drawback of prior solutions is the static nature of the search results, which often provides an overwhelming number of cases, statutes, or other legal materials that users must sift through manually. These results are usually presented with minimal contextual analysis, forcing users to determine relevance based on their subjective assessment of the results. The absence of dynamic filtering and ranking based on comprehensive relevance scoring remains a challenge in these systems.

Further, existing legal research tools often do not adapt to the evolving needs of users. Repeated searches in the same jurisdiction or within similar time frames can become cumbersome since users regularly have to re-enter the same criteria for each new search. There also tends to be limited functionality for organizing and labelling search results, making it difficult to manage and streamline research over time.

Moreover, the rate at which results are processed and returned to users can be relatively slow in some systems, as complex searches may require significant computing power and time to execute. Additionally, when errors occur, users are frequently left with little information on why a search failed or what steps could be taken to correct the issue, creating a gap in user experience and the potential for interrupted research workflow.

These challenges highlight the need for a more advanced system—one that not only leverages the capabilities of AI and machine learning but also improves upon the user interface, search efficiency, and result management to create a more seamless and effective legal research experience. The deficiencies of the preexisting options set the stage for innovation, aiming to deliver a more intuitive, efficient, and user-friendly legal research tool.

SUMMARY OF THE DISCLOSURE

In one or more implementations, a computer-implemented system for processing legal research questions posted to a legal database is disclosed. The system comprises a first user interface (UI) implemented by code. This code is executed in a first processor. The first processor has an input that receives search criteria in the form of a text prompt from a user. An application program interface (API) is implemented by code. This code is executing in a second processor. The second processor has an input for receiving the search criteria from the UI. It also has an output for outputting the search criteria that is received. The UI and the API communicate with each other over an electronic connection.

The system further comprises an instruction base that operates on text prompts provided to it. The instruction base expands the text prompts into snippets. These snippets are usable by a machine learning network to define a search. The search will be applied to the legal database. A machine learning network is part of the system. There is a transformation module that includes code. This code is executing in a third processor. The transformation module responds to the search criteria received from the API. It provides the search criteria to the instruction base. The instruction base then defines the search to be applied to the legal database.

In accordance with a salient aspect of the disclosure, the received search criteria is processed through the transformation module. In one or more implementations, the system processes include at least the following: tokenizing the normalized text into smaller units, recognizing and tagging specific legal terms or phrases within the tokens, and converting the tokens into embeddings. These embeddings are detailed representations using an instruction base. The embeddings are formatted to be compatible with the machine learning network.

Additionally, the system comprises a non-transitory computer memory that is connected to the system. It receives an output from the legal database. This occurs in response to the search criteria applied to the instruction base. Lastly, there is a second UI implemented by code. This code is executing in the first processor. The second UI provides an interactive interface. It includes code implemented in the first processor that configures the second interface. This configuration allows the second interface to provide the user with the output included in the memory. It also allows the second interface to receive further input from the user and to present details of the results.

In further implementations expanding upon the system described, the system includes several auxiliary features enhancing the user's research capabilities. One such aspect involves the user interface (UI) incorporating a feature allowing users to specify court search criteria by selecting from a curated list of courts. In further aspects, this UI also provides a feature for defining time range search criteria to refine the search process. Integral to the system is a database; this repository stores both the search criteria inputted by users and the corresponding search query identifiers, which are created and managed by an application program interface (API). Further aspects of the disclosure incorporate a general instruction base that is designed to create these search query identifiers upon receiving search criteria from the UI which are then paired with the search criteria in the database.

Further implementations of the present disclosure incorporate a machine learning network's ability to utilize large language models (LLMs). These models generate Boolean keyword searches derived from the text prompts obtained from the instruction base. Additionally, in further aspects, there is a search results interface connected to the non-transitory computer memory. It is refined to exhibit search criteria and results classified by relevance score, also furnishing interactive components that empower users to modify those relevance score thresholds as required.

Finally, according to one or more implementations, in the event of a failed search operation, the system is capable of creating an exhaustive error report. This report can be stored within the non-transitory computer memory for subsequent retrieval and analysis. In further implementations, the machine learning network is also keyed to assess returned case law documents. It generates a relevance score and crafts a concise explanatory summary, thus aligning the case law substance with the textual content of the search criteria. In yet further aspects designed to enhance the user interface, the search results display is structured to cluster results by keyword combinations. In still further implementations of the present disclosure, the system output UI sequences cases based on both their relevance scores and citation frequency to provide a hierarchically organized presentation of research findings. Throughout the present disclosure, use of "caselaw" and "case law" (one word versus two) are intended to mean the same thing.

The present disclosure also relates to a method for processing legal research questions in a computer-implemented environment. The method includes several steps. The first step involves receiving search criteria. This is done via a user interface (UI). The UI is implemented by code executing in a processor. The search criteria come in the form of a text prompt from a user, wherein the text prompt can be keywords, a detailed plain English summary of the case requirements, whole emails requesting legal research, or any other text medium that describes legal requirements. The next step comprises transmitting the received search criteria. This transmission goes to an application program interface (API) via an electronic connection. The following step involves expanding the text prompts. This is done by an instruction base. The instruction base turns the text prompts into snippets. These snippets are suitable for use by a machine learning network. The network then defines a search to be applied to a legal database.

The method also includes processing the search criteria. This processing comes through a transformation module. The module provides the search criteria to the instruction base. The transformation module comprises code executing in the processor. Another step involves triggering a search operation. This triggering is done by the API upon receipt of the search criteria. The legal database uses the defined search keywords to perform this operation.

One of the final method steps according to one or more implementations comprises receiving a search result output. This reception happens at a non-transitory computer memory in response to the search operation wherein search results are then provided to a user. This provision is through a second UI. The second UI includes an interactive interface. It is configured to display the search result from the memory. The final step is organizing the displayed search results. This is done by relevance score. The cases within the search results are arranged accordingly.

In nuanced variations of the method for processing legal research questions, several features have been incorporated to further refine the user experience and search precision. In some implementations, the process of receiving search criteria via a user interface (UI) is enhanced to include the capture of court-specific criteria, which users can select from a predetermined list of courts. This enhanced capture step offers users the convenience of choosing from historical search criteria that pertain to the same legal jurisdiction and time range, thereby streamlining subsequent searches. Further aspects of the disclosed method also encompass the assignment of a unique search query identifier to newly received search criteria, with both elements being stored in an accessible database.

In yet further implementations of the method disclosed, and subsequent to the assignment detailed above, the unique search query identifier is employed to fetch and display previous search criteria and their outcomes via a search results UI, allowing for efficient review and reuse of past research efforts. In additional aspects, the machine learning network is configured to include at least one large language model (LLM). This LLM is particularly structured to create Boolean keyword searches informed by the expanded text prompts, enhancing search relevancy and reach. As stated above, the text prompt can be keywords, a detailed plain English summary of the case requirements, whole emails requesting legal research, or any other text medium that describes legal requirements.

In still further aspects of the disclosed method, the method further extends to filter the returned search results, where additional court filters or time range filters are applied. In various implementations, these filters are generated by the LLM based on the initial search criteria provided by the user, with the capability to automatically apply court filters derived from the text prompt even without specific user instruction. Moreover, one or more aspects of the disclosed method include evaluating the returned case law documents by calculating a relevance score using an LLM, resulting in the organization of search results in a descending order of said relevance score. For each case law document with a high relevance score, a detailed summary is generated. This ensures cases of greater interest are accompanied by longer, more informative summaries, thus providing a clearer insight into their relevance relative to the user's search prompt.

BRIEF DESCRIPTION OF THE DRAWINGS

The foregoing and other objects and advantages of the present disclosure will become more apparent when considered in connection with the following detailed description and appended drawings in which like designations denote like elements in the various views, and wherein.

DETAILED DESCRIPTION OF THE DISCLOSURE

Figure 1:
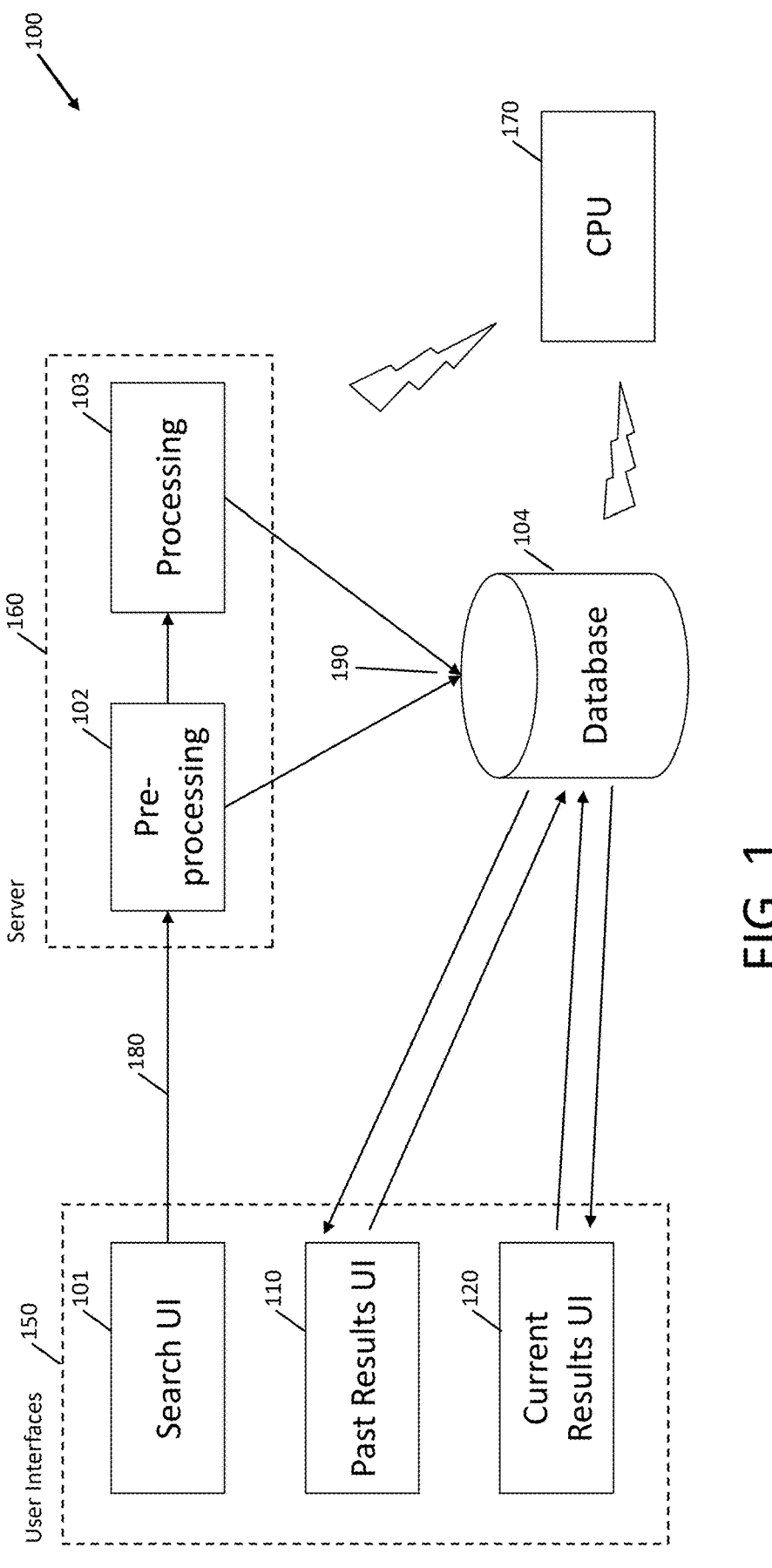
FIG. 1 is a computer-implemented AI-powered system 100 for processing legal research questions posted to a legal database according to at least one embodiment of the present disclosure. According to one aspect, computer terminal 150 includes the capacity to display a set of user interfaces ("UIs").

Advancements in artificial intelligence (AI) and machine learning have significantly impacted the legal research field, offering tools that extend beyond the capabilities of traditional legal research databases. These AI-driven tools can now process natural language inputs, learning from interactions and refining their algorithms to improve search results over time. Such advancements represent an effort to address known deficiencies of prior tools, which often require exacting search terms and offer limited support in sifting through irrelevant information to find pertinent legal materials.

Despite computer-aided legal research technological strides over the past decade, there remain critical areas where traditional computer-aided legal research tools fall short. These systems tend to depend heavily on a user's ability to effectively use Boolean logic and navigate complex search criteria, which can be daunting and time-consuming. Additionally, preexisting solutions may present an overwhelming amount of data with no significance ranking, leaving users to manually discern the material's relevance to their legal questions. This process can not only be inefficient but also prone to user error, leading to overlooked or misapprehended information.

The present disclosure seeks to address these deficiencies by introducing a more refined and user-friendly approach to legal research, leveraging the power of large language models (LLMs) and AI. The advanced system comprises a user interface for streamlined data entry, enabling users to describe legal requirements, select courts, and define time ranges. A unique feature of this interface is its ability to allow users to flag searches, view search history, and reuse criteria, optimizing the process for recurring legal jurisdictions and time range inquiries.

Upon receiving the input, the system transmits the criteria to a server where it is assigned an identifier and undergoes a sophisticated transformation process involving innovative machine learning techniques. The server operates in two main functional components, representing the input reception and processing stages. These components function synchronously to trigger searches with improved speed and efficiency, ultimately writing the outcome to a dedicated database. Notably, the present disclosure follows a dynamic approach where the splitting of input and processing reflects the computing demands, allowing for a future where instantaneous processing may consolidate these stages.

The second user interface is tasked with displaying past and current searches, managing the results, which are sorted based on a calculated relevance score provided by an underlying machine learning network. This approach offers a methodical organization of search results, prioritizing by relevance and citation frequency, addressing the former challenge of non-contextual data presentation.

Addressing the need for more contextually relevant searches, the LLMs used within the system generate both keyword searches and additional filter criteria based on natural language prompts. This capability includes generating court filters or time ranges when not specifically defined by the user, adding an intelligent layer of query refinement that reduces manual input errors and enhances search relevance.

Through its architecture and processing mechanisms, the present disclosure establishes a new paradigm in legal research, characterized by greater accuracy, efficiency, user adaptability, and automated contextual understanding. It promises to alleviate the hurdles faced by legal professionals and researchers by leveraging the latest advancements in AI and machine learning for optimized legal research experiences.

The code utilized by one or more embodiments of the present invention comprise instructions that control the processor or processors of the computer or computers to execute methods, such as detailed in FIGS. 1 through 5 below. The instructions can comprise a program, a single module, or a plurality of modules that operate in cooperation with one another. More generally, the code comprises a portion of an embodiment implemented as software. The module(s) that comprise a software embodiment can include anything that can be executed by a computer such as, for example, compiled code, binary machine level instructions, assembly code, source level code, scripts, function calls, library routines, and the like. In other embodiments, the code can be implemented in firmware or a hardware arrangement.

FIG. 1 is a computer-implemented AI-powered system 100 for processing legal research questions posted to a legal database according to at least one embodiment of the present disclosure. According to one aspect, computer terminal 150 includes the capacity to display a set of user interfaces ("UIs"). Computer terminal 150 comprises code executing on a first processor. Computer terminal 150 is capable of displaying a search UI 101. In various implementations, computer terminal 150 comprises a laptop, a desktop, a mobile phone application, or other consumer electronic device. In one or more implementations, the search UI 101 comprises a text box to describe a user's legal requirements for a legal search. In further aspects, the search UI comprises a list of courts to be used as search criteria. In yet further aspects, the search UI consists of a list of time ranges to be used as search criteria. In some implementations, the search UI courts and time range search criteria are capable of being newly defined by a user. In additional implementations, the courts and time range search criteria are capable of being recalled by a user by looking at previous search criteria. This function serves of purpose of enabling users to repeatedly search with the same legal jurisdiction and time ranges quickly. In further embodiments, other mediums for populating search UI 101—or which serve the same function as search UI 101—include a word processor add-on or plug-in. In such embodiments, this word processor add-on is capable of pulling legal requirements or search criteria directly from text inputted into the word processor by a user. In yet further embodiments, a mobile phone application may be substituted for the word processor, which would allow the user to define the same search criteria listed above. In yet further implementations, additional search criteria beyond what is explicitly disclosed herein may be included in the search UI 101.

Once search requirements are defined by and are input into the search UI 101 by a user, the search requirements are passed to a server 160 according to one or more implementations. The server 160 is capable of being operated within the cloud, through a wireless network, or through a local network. The server 160 comprises a request processor 102 and a search processor 103. The request processor 102 receives the search requirements and then assign a search query identifier. The request processor 102 then writes the search requirements and query identifier to a database 104 by executing code in a second processor, according to some implementations. In various aspects, a database 104 is a storage repository for data and is capable of storing legal search result information. In one or more implementations, the second processor is located within the server 160. In most implementations, server 160 is communicatively connected via electronic connection to the database 104. The connection can be wired, wireless, or cloud based. In some implementations, the first and second processors are on a single server. In some variations, the request processor 102 and search processor 103 are on different servers.

In one or more implementations, when search processor 103 writes the search requirements and query identifier to a database 104, this action triggers processing of the search query in search processor 103. In one or more implementations, search processor 103 comprises conducting a search for case law. In various aspects, search processor 103 involves accessing third-party caselaw databases, such as Google Case Law, Westlaw, LexisNexis, Fastcase, or any number of other caselaw and legal authority repositories, whether maintained by private companies (e.g., Westlaw) or for non-profit public access (e.g., PACER). Additionally, in one or more implementations, search processor 103 further writes to the database 104 once a caselaw or legal authority search is complete via execution of code stored in the second processor and by transmitting data across the electrical connection between the server 160 and the database 104. Search processor 103 writes various details to the database 104 including one or more of the following: resulting case law responsive to the search query, a third-party source where caselaw was drawn from, reviews of the caselaw drawn from any external sources, relevance scores for the case law generated within search processor 103, and other details relevant to caselaw analyses. The database 104 may be housed in varied locations. The database 104 may be stored in memory on the same sever 160, within user computer terminal 150, a separate (second) server, across a number of servers, or through wirelessly connected cloud storage. In various aspects, database 104 is electrically connected to and controlled by a CPU 170 which processes "read to" and "write from" commands by executing code in a third processor. In further aspects, database 104 and CPU 170 are both housed within computing terminal 150.

The database 104 is capable of storing a search trigger identifier generated by the request processor 102. Restated, the database 104 stores the status of the search as it passes from being submitted in search UI 101 to preprocessing in request processor 102 to processing in search processor 103 to search completion status once search processor 103 has finished processing. The database 104 also is capable of storing the results generating by the search processor 103. In various aspects, the information stored in database 104 that originated from either or both the request processor 102 or search processor 103 further comprises completed searches, information contained within data related to a completed search, or a notification that the search process encountered an error and was not able to be completed. In various implementations, the request (102) and search processor (103) communicate via a queue. In some implementations, search UI 101 communicates with the request processor (102) via HTTP.

The inventors have discovered surprising advantages to dividing a request processor (sometimes also referred to as a pre-processing module) 102 and a search processor (sometimes also referred to as a processing module) 103. In implementations consistent with the present disclosure and related inventor developments where request processor 102 and search processor 103 are divided, surprising advantages presented themselves, such as reducing delay from the tasking computation time inherent to search processor 103, which is tasked with several functions, detailed further in the disclosure below. In some implementations, breaking the process down into smaller steps allows for smaller tasks that have shorter run time, use less memory, reduce cost (for run time/the memory size of the machine required), ease of debugging because of modularity, and ease of tracking the progress of searches. Such configurations also aid in improving system reliability.

Current technological computing limitations lead to extended wait times between search submissions by a user and search completion by the system disclosed herein. These wait times can be seconds (approximately 1 to 59 seconds) or minutes (approximately 1 to 5 minutes). Dividing request processor 102 and search processor 103 makes it possible for a user interface on computer terminal 150 to display to the user, by communicating with the server 160 housing request processor 102, that a search query was submitted and is still processing. Meanwhile, search processor 103 completes processing and then writes either successfully completed search results to computer terminal 150 or writes an error message to computer terminal 150. As computation speeds continue to increase and LLM model implementations become quicker, alternative implementations of the present disclosure will feature a combination of request processor 102 and search processor 103.

In various embodiments, computer terminal 150 is further capable of displaying a past results UI 110 through code executing on the first processor. This past results UI 110 is a user interface that is capable of displaying past caselaw searches and their results. The past results UI 110, according to various aspects, is further capable of displaying multiple searches, the search criteria for east past search, as well as links to the search results generated therefor. By way of non-limiting example, the past search criteria, in some aspects, will still include a recitation of the case law requirement, the search criteria, and the time range that were previously input to the search UI 101 by the user. Past search result information displayed in the past results UI 110 was originally written to and then pulled from database 104 after being processed by search processor 103 within server 160. This is done by executing code on either or both the second 102 and third 103 processors, which are electrically connected to server 160 and database 104, respectively. When a user clicks on a link to view past results displayed in past results UI 110, data in a database 104 storing past search result information is filtered for results related to the past query identifier generated in element 102. The term "processor," as used throughout the contents herein, is often used to refer to one element running a process, like, for example, a UI, a preprocessing step (such as the request processor 102), and a processing step (such as search processor 103).

A current results UI 120 is capable of displaying caselaw results for results of either a single past or current search that is presently of interest to the user, according to some embodiments of the present disclosure. Unlike past results UI 110, current results UI 120 lists all caselaw found for a single past or present caselaw or legal authority search. For example, when a user clicks on a link to view search results in the current results UI 120, the database 104 is filtered for the results for that specific query identifier (created in pre-processing element 102). Element 120 then displays the results of the case law search. In some aspects, the current results UI 120 may display one or more of the general search criteria: (1) legal requirements, (2) the time range filter, (3) the courts filters, and (4) the AI model version utilized by search processor 103. When processing is complete within search processor 103, the current results UI 120 will eventually display search results for the particular legal authority search of interest input by or selected by the user.

In various implementations, the search results displayed in the current results UI 120 are organized by one or more broad keyword search categories (e.g. "university" AND "free speech") followed by the resulting info for some or all of the cases found using those keywords. In further aspects, the case info includes the caselaw or legal authority title (e.g., "Jones vs. U.S.") or a full citation of the case (e.g., in Bluebook style). In yet further aspects, as a third layer of ordering, the cases under a specific keyword pair include an adjacent display of the number of times the case has been cited. In one salient aspect of the present disclosure, a relevance score and relevance analysis are both displayed corresponding to each listed case law or legal authority result. In various implementations, either or both a relevance score and relevance qualitative analysis are generated by the search processor 103.

There are various ways to implement an organizational rule system for displaying caselaw or legal authority results in current results UI 120. In further implementations consistent with this disclosure, keyword searches displayed in the current results UI 120 are ordered by highest composite relevance score. For example, in a search result list where the keyword search pair of "university" AND "free speech" resulted in three cases with relevance scores of "4" while the keyword search pair of "university" AND "discrimination" resulted in one case with relevance score of 5, then the latter keyword search pair would be displayed first, because it has the most relevant case. In an additional example of a set of rules for ordering search results displayed in current results UI 120, performed by writing code to and executing it on the first processor, if two sets of search keywords have equal "highest relevancy" scores, then the tie would be broken by the keyword with the greatest number of "high relevance" cases (e.g., a keyword with two relevance scores of 4 beats one relevance score of 4). In such an example, if two sets of keywords have the same "high relevance score" and "number of relevant cases," then a third tie-breaking criteria may include the number of times the cases have been cited. There are many other ways to construct an ordering algorithm for the listing of search results in current results UI 120, and these are merely examples.

Alternatively, the results in current results UI 120 are orderable by average scores assigned to cases found under various keyword set combinations, by total relevance score, by total number of citations, a combination of relevance score and citations, or via additional criteria. In further implementations, a user may dictate how search results are ordered in current results UI 120 by defining this set of rules while accessing search UI 101 or after receiving a list of results at the completion of the search processing stage. In one or more aspects, once keyword sets are ordered by relevance, the case results nested below each keyword set are ordered from highest relevance score to lowest. In such an example, relevance score ties are broken by the number of citations and ranked from highest to lowest.

In at least one implementation of the current results UI 120, the UI 120 only shows cases with relevance scores that are "3" or greater (or some other predefined quantitative metric for quality). In further implementations, users can also change this setting to specify and display more or few cases. This will allow users to see more or less cases depending on their unique search necessities. Keywords with no cases equal to or above the threshold display a message such as "no relevant cases found for this keyword," or some alternative statement informing a user that no relevant cases were found for a keyword or set of keywords.

Figure 2:
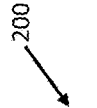
FIG. 2 is a flowchart 200 depicting machine learning network-powered caselaw search mechanics according to at least one embodiment of the present disclosure.

FIG. 2 is a flowchart 200 depicting machine learning network-powered caselaw search mechanics according to at least one embodiment of the present disclosure. FIG. 2 depicts the complexity of the steps involved in the search processing described above in relation to search processor 103 in FIG. 1. The flowchart steps and nodes are performed through execution of code in a processor as well as data transmission to and reception from various machine learning network models.

In one or more implementations, element 201 represents caselaw query information in the form of a data structure sent to a server (like server 160 in FIG. 1). Element 201 involves three sub-elements: a legal research prompt 203, court filters 205, and time range filters 207. The legal research prompt element 203 is a description of required caselaw input by a user. The legal research prompt element 203 can take the form of many structures, such as a legal statement that needs a citation, an email from a lawyer or client containing a request for research on a specific legal topic, a high-level description of a case, a request for nuanced differences from prominent precedential caselaw in a specific legal field, or any other natural language structure for describing the requirements for a caselaw search.

The flowchart 200 depicts the legal research prompt 203 being transmitted to two large language model (LLM) elements—LLM 209 and LLM 211, respectively, according to one or more implementations of the present disclosure.

According to a salient aspect of the inventive premise of the present disclosure, an LLM is a type of machine learning model. Many different types of artificial intelligence and machine learning models, algorithms, or networks can be used interchangeably for various implementations of the present disclosure wherever "LLM" or "machine learning model" is disclosed. Examples of types of machine learning algorithms can be categorized into five broad groups: supervised, semi-supervised, unsupervised, reinforcement learning, and transfer learning. These categories are based on factors like training methodologies, data used, problem definition, and output feedback. Various algorithms are interchangeably usable with the general categories including the following: nearest neighbor, Naïve Bayes, decision trees, linear regression, support vector machines, neural networks, k-means clustering, Q-learning, temporal difference, deep adversarial networks, and others. Within the context of the present disclosure, an LLM is a type of neural network, often based on a transformer architecture, though others may be used. Other types of feasible neural networks for the present disclosure further include but are not limited to the following: perception, feed-forward, multilayer perceptron, convolutional, radial basis functional, recurrent, long short-term memory, sequence to sequence, and modular networks.

As depicted in flowchart 200 and according to at least one implementation of the present disclosure, once the legal research prompt 203 is transmitted to two LLM elements 209 and 211, the LLM element 209 takes the legal research prompt and generates a list of possible Boolean keyword searches to find relevant caselaw. Alternatively, additional implementations consistent with the present disclosure may include transmission of elements 203, 205, and 207 to more than two LLM elements.

One non-limiting example of a legal research prompt 203 is as follows: "Federal courts of appeal have held that colleges can't discriminate against student organizations based on political views, even if those views can be perceived as offensive to some." Within one aspect of the present disclosure, the LLM from element 209 would generate the following Boolean keyword set searches: (1) ("university" OR "college") AND "free speech," (2) "student organizations" AND "political views," (3) "first amendment" AND ("university" OR "college"). This resulting list would then become element 213—the search criteria list.

Continuing with the non-limiting example above, the LLM element 211 generates any additional court filters or time range filters. For example, "Federal courts of appeal" will be pulled from the example legal research prompt element 203 and then only cases in federal courts of appeal will be searched. If the user did not define court filters, this new filter will be applied automatically. Alternatively, in one or more variations of the present disclosure, a search user interface (like search UI 101 in FIG. 1) may prompt a user to dictate whether they wish to include the filter. LLM element 211 also performs a similar determination for time ranges as well and would extract relevant time range limitation information to be applied to a legal search. The example legal research prompt provided for element above 203 ("Federal courts of appeal have held that colleges can't discriminate against student organizations based on political views, even if those views can be perceived as offensive to some.") does not have a time range specified, but LLMs possess the capacity to assign lower or upper bounds of time, ranges of time, or specific years based on legal research prompt context.

Continuing again with the non-limiting example above, element 215 represents a legal keyword search engine and is comparable to and includes most modern legal research tools (e.g., third-party caselaw databases, such as Google Case Law, Westlaw, LexisNexis, Fastcase, or any number of other caselaw and legal authority repositories, whether maintained by private companies (e.g., Westlaw) or for non-profit public access (e.g., PACER)). Such databases are capable of searches based on combinations of keywords, courts, and times ranges. One or more implementations of the system disclosed herein identifies and properly structures these parameters via input from elements 205, 207, 211, and 213. The search engine then finds caselaw documents that fit those parameters. The information from each returned case is then saved to database 104 such as the title, bluebook citation, number of times cited, court, date, case text, and other information provided by the caselaw database.

As a next step, decision node element 217 determines— through further execution of code in a processor—if there are more keyword search criteria in the search criteria list 213. If yes, then the process loops back to element 213 and proceeds once again through the legal keyword search engine 215 to search the caselaw database again with the new set of keywords. Once this recursion is complete and there are no more keywords to be searched, element 219 determines if any cases were found. If no relevant cases were found, case law query data is once again transmitted to the LLM element 209 for further processing. Using the previously generated keywords, the LLM is instructed through code executing in a processor that the prior search did not result in finding cases and different keyword sets must once again be generated. If cases are found through this second (or recurring) attempt, then all the resulting caselaw data from element 215 is compiled into a search criteria and case law data result element 221.

Once data from element 215 is compiled into the search criteria and case law data result element 221, data is then transmitted into an LLM 223 (either the same or a different LLM as 209) with the original legal research prompt from element 203. The LLM, in conjunction with the legal research database 215, uses the original legal research prompt to assess the text from each case and then provide a relevance score. In one or more implementations, a 1 to 5 rating is utilized for relevance score, where 1 is the lowest and 5 is the highest. However, any rubric can be defined and transmitted to the LLM. LLM element 221 then generates a natural-language summary explaining how the caselaw is relevant to the original legal research prompt 203.

In one or more implementations, case summaries are generate for each relevant case, and each case summary is assessed a relevance score in a determination element 227. Determination element 227 may, in some variations, incorporate a limitation wherein each highly rated case (in this example cases with scores of 4 or 5) must have a summary with more than 10 words. Lower rated cases can have shorter summaries, such as, for example, "this case is not relevant to the prompt," but highly relevant cases require longer summaries for the purpose of eventually empowering a user at the current results UI 120 stage (from FIG. 1) to appreciate the fit between the user's research prompt input and the results. Element 225 serves the function of requiring that all cases include a summary and score. If the LLM 223 does not generate an invalid score or fails to generate a summary (i.e., if it fails to satisfy either determination requirements in element 225) then the respective case at issue is rerun through the LLM element 223. Elements 221, 223, 227, and 225 form a loop that are capable of being performed either in series or in parallel according to various implementations. The inventors have surprisingly determined through extensive experimentation that parallel processing within this loop leads to a substantial increase in processing and completion speed within search processor 103 (depicted as the flowchart in FIG. 2).

Once summaries and scores are generated and verified for each case, the caselaw data from the caselaw search engine in element 215, the summaries and scores generated in LLM element 223, and the original research prompt, court filters, and time ranges are written to the database element 104, which was described above in the context of FIG. 1 and depicted in FIG. 1. In various implementations, if there is an error at any step of the process depicted in FIG. 2 flowchart 200, an error will be written to the legal research database (element 104) that will consist of a flag instructing that the query ended in an error. In such a case, the text description of the error will be logged for future debugging.

Figure 3:
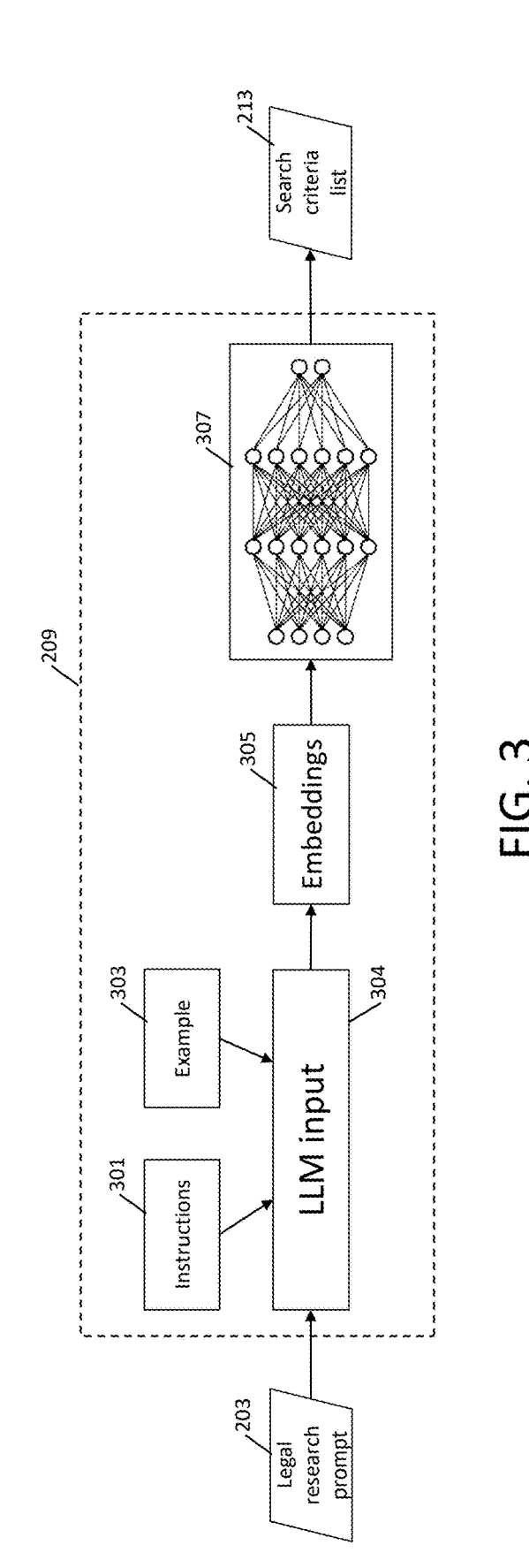
FIG. 3 is an exemplary embodiment of the internal machinations of element 209 from FIG. 2, which depicts the sub-step flow of internal research prompt processing.

FIG. 3 is an exemplary embodiment of the internal machinations of element 209 from FIG. 2, which depicts the sub-step flow of internal research prompt processing. Element 203 in FIG. 3 is the legal research prompt from FIG. 2 which transmit legal research prompt data into element 209 according to one or more implementations of the present disclosure. In Element 209, element 203 is combined with instructions (element 301) and examples (element 303). In some implementations, the instructions 301 are directions on how to generate keywords and can include suggestions such as keeping the keyworks general enough to be found in other caselaw documents. Each suggested keyword search should be unique and not be repetitive while also potentially incorporating other suggestions to improve the keywords generation. Also, the instructions 301 have specifications about the format/data structure the LLM 307 should return the searches in. Element 303 represents an example research prompt and keyword(s) result.

In the following example, the data structure JSON was used, but any format/data structure can be defined in the instructions (element 301) and then demonstrated in the example (element 303).

Example Instruction (element 301): 'Generate keywords to search for the following legal topic and return them in JSON format'

Example Research Prompt and Keywords Result (Element 303):

```
{
    "input": "Federal courts of appeal have held that colleges can't discriminate
against student organizations based on political views, even if those views can be
perceived as offensive to some.",
    "output": [
        "('university' OR 'college') AND 'free speech'",
        "'student organizations' AND 'political views'",
        "'first amendment' AND ('university' OR 'college')"
    ]
}
```

Figure 4:
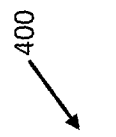
FIG. 4 is an expanded view of a flowchart depicting the embeddings process represented by FIG. 3's element 305, according to one or more implementations of the present disclosure.

Combining the instruction (301), the example (303), and the user defined legal research prompt (203) leads embedding generation in element 305. Generating embeddings involves converting the text from the legal research prompt (203), the instruction (301), and the example (303) into a numerical format that the Large Language Model (LLM) 307 can understand and process—this flow process is depicted in FIG. 4 and detailed further below. The embedding generation conversion is crucial as neural networks, including the LLM 307 or other LLMs, operate as a complex network of numerical computations and not raw text.

In FIG. 3's Element 307, the generated embeddings from embeddings element 305 are fed into the neural network, specifically the Large Language Model (LLM) 307. As the LLM 307 processes these embeddings, it deciphers, through code executing in one or more processors at one or more locations and potentially within one or more servers, the intent behind the user's legal research prompt (element 203), contextualizing it with the provided instruction (Element 301) and the example (Element 303). Drawing insights from the intricate relationships between these three elements, the LLM 307 formulates an output, represented by Search Criteria List element 213. This Search Criteria List element 213 is an output which encompasses a set of optimal keywords crafted to align with the user's research intent. Ideally, these keywords will not only resonate with the essence of the research prompt but will also conform to the stipulated format and guidelines, as outlined in the instructions 301 and exemplified in the provided example 303.

FIG. 4 is an expanded view of a flowchart depicting the embeddings process represented by FIG. 3's element 305, according to one or more implementations of the present disclosure. In Element 305, the combination of elements 203, 301, and 303 (from FIG. 3) undergoes the embedding process detailed in FIG. 4, which incorporates a combination of four steps, with an optional fifth step.

Embedding Step One is Tokenization (401): Combined text is broken down into smaller chunks, which can be words, subwords, or even characters. This tokenization process ensures that the LLM 307 can handle the text in manageable pieces.

Embedding Step Two is Vectorization (402): Each token from Step One is then mapped to a high-dimensional vector. This vector representation captures the semantic meaning of the token. For instance, the words "university" and "college" might have similar vector representations since they have related meanings.

Embedding Step Three is Sequence Formation (403): Once all tokens have their corresponding vectors, they are organized into a sequence. This sequence feeds into the LLM 307, maintaining the order of the input, which is crucial for understanding the context and relationships between different parts of the text.

Embedding Step Four is Dimensionality and Padding (404): Neural networks (such as LLMs) require consistent input sizes. If the input sequences vary in length, they are made consistent through a process called padding. Padding involves adding 'dummy' tokens to shorter sequences until they match the length of the longest sequence.

(Optional) Embedding Step Five is Normalization (406): Sometimes, to ensure that the model behaves predictably, the vectors are normalized. This process ensures that all vectors have a consistent magnitude, focusing solely on their direction in the high-dimensional space.

Figure 5:
FIG. 5 is an expanded view of the flow process within element 215 depicted in FIG. 2, according to one or more implementations of the present disclosure.
Figure 5:
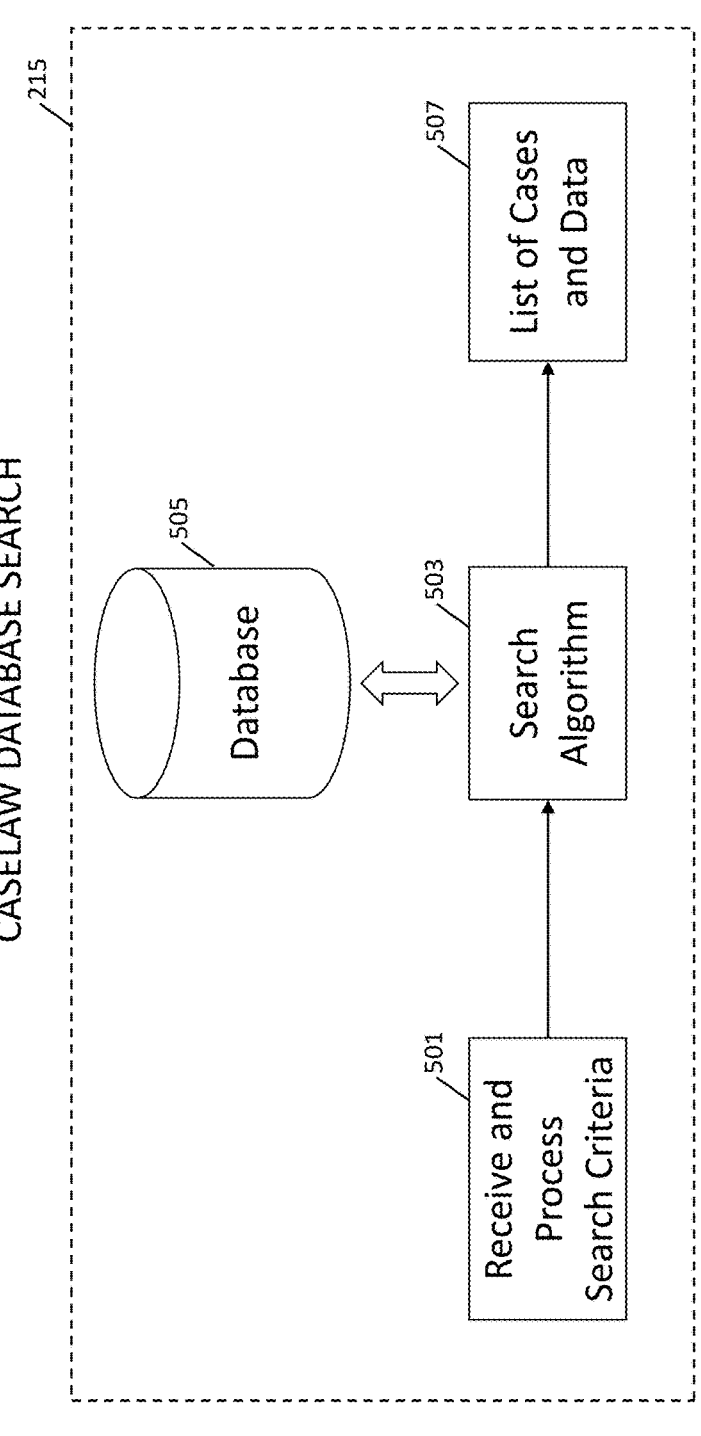

FIG. 5 is an expanded view of the flow process within element 215 depicted in FIG. 2, according to one or more implementations of the present disclosure. Returning briefly to FIG. 2, LLM Element 211 has a very similar architecture as LLM 209; however, the instructions and examples are different. Both feed into element 215 in FIG. 2, which is depicted in an expanded view in FIG. 5.

The goal of LLM 211 (in FIG. 2) is to find court filtering or time range filtering information. In the following example of the code for processing and outputting data from LLM element 211, the data structure JSON was again used, but any format/data structure can be defined in the instructions and then demonstrated in the example.

Instructions: 'Analyze the legal text to identify relevant courts or jurisdictions and potential time ranges, if mentioned. Return the filtering details in JSON format.'

Example

```
{
    "input": "Federal courts of appeal have held that colleges can't discriminate
against student organizations based on political views, even if those views can be
perceived as offensive to some.",
        "output": {
            "court": {
                "1st district federal court of appeals": true,
                "2nd district federal court of appeals": true,
                "3rd district federal court of appeals": true,
                "4th district federal court of appeals": true,
                "5th district federal court of appeals": true, ...
            },
            "lower_bound_date": "",
            "upper_bound_date": ""
        }
}
```

Instructions within the element 211 can instruct an LLM model to output all courts or just the those of interest. This reduces the number of tokens generated through a process similar to the one depicted in FIG. 4, which saves costs for LLM hosting, computation, or LLM APIs that charge per token inputted and generated. Using the same or similar embedding process as in FIG. 4, the instructions, example, and user generated legal research prompt are embedded and fed into the neural network—again, this process is occurring within element 211, in parallel with the similar process occurring within element 209. The outputs are then either delivered to the user to ask if these filters should be applied or automatically applied to the caselaw database search in element 215.

Element 215 (both in FIG. 2 and in an expanded view in FIG. 5) represents a salient aspect of the present disclosure: the caselaw database search. In Element 215, the process of searching through a caselaw database, akin to renowned platforms like Google Caselaw or Westlaw, is initiated. At the outset, "Receive and Process Search Criteria" element 501 involves ingesting the keywords, court filters, and time ranges generated by the LLM or by the user directly.

Moving to "Search Algorithm" element 503, this step involves a search engine delving into its vast repository of caselaw data 505. Using advanced indexing and retrieval mechanisms, it sifts through countless records, filtering results based on the specific courts and time frames, if provided. This stage is imperative, ensuring that the results are not just relevant due to keyword matches but are also contextually fitting based on jurisdiction and temporal significance.

In "List of Cases and Data" element 507, the search engine retrieves comprehensive details for each case in a refined and ranked list. This includes, but is not limited to, the case name, the involved parties, the court's decision, the presiding judge, citation details, and the full text of the judgment. Such meticulous extraction guarantees that users have all the information they need at their fingertips.

On the aggregate, Element 215 encapsulates a robust and dynamic process, bridging the gap between intricate legal queries and the vast expanse of caselaw data, delivering precise and comprehensive results with each query.

Returning once again to FIG. 2, element 223 represents a "Caselaw Relevance" LLM processing step, according to some implementations of the present disclosure. LLM Element 223 has a very similar architecture as LLM 209; however, the instructions and examples are different. The goal of LLM 223 is to score how relevant the caselaw results are to the original legal research prompt.

The instruction at this stage should include information about generating a relevance score and then a summary to explain the relevance score. It should also contain a rubric that defines how the text should be scored. Also, if an LLM with limited memory is employed for an application consistent with the present disclosure, the entire text of case is not always required for input. Including the title, the decision summary, and then searching the documents for the keywords that flagged the document are often sufficient. In one or more implementations, these inputs should be in addition to adding the sentence before, containing, and after the keyword-doing so generally provides the LLM enough context to rank, score, or otherwise determine relevance of the results, without requiring processing the entire case authority or legal document.

The Instructions and Example below are representative of the type of data fed into and resulting in outputs from LLM element 223, depicted in FIG. 2. The instruction, example, original caselaw prompt, and text for the caselaw being analysed for relevance are fed into the embeddings element, such as the Embeddings process represented by FIG. 4. The embeddings are then input into the neural network and the score and summary in JSON are output. Again, the process is similar to the flow process depicted in FIG. 3 for element 209, but with discrepancies highlighted by the following exemplary inputs:

Instructions: "Analyze the provided legal research prompt and the summarized caselaw document text. Generate a relevance score on a scale from 1 (not relevant) to 5 (highly relevant) based on how well the caselaw aligns with the research prompt. Additionally, provide a concise summary that elucidates the rationale behind the score, citing specific elements or parallels between the research prompt and the caselaw.

Scoring Rubric:
1. Not relevant: No discernible connection between the caselaw and the research prompt.
2. Slightly relevant: Minimal and indirect connections present.
3. Moderately relevant: Some direct parallels between the caselaw and the research prompt, but not comprehensive.
4. Highly relevant: Strong alignment with the research prompt, with only minor elements being unaddressed.
5. Directly relevant: The caselaw almost entirely encapsulates the essence of the research prompt."

Example

```
{
  "input": "Prompt: Federal courts of appeal have held that colleges can't
discriminate against student organizations based on political views, even if those
views can be perceived as offensive to some.
Caselaw document text: The 8th District Federal Court ruled that students
wearing armbands to express their political views were unjustly punished by the
college administration. Citing freedom of expression, the court emphasized that
educational institutions must not discriminate based on political beliefs.",
  "output": {
    "score": 4,
    "summary": "The case describes a situation where students were punished for
expressing their political views through wearing armbands. This parallels the
caselaw requirement that colleges cannot discriminate against student
organizations based on political views."
  }
}
```

To summarize critical interplays between FIGS. 1-5—all of which are interconnected according to one or more embodiments of the present disclosure—In some implementations, a computer-implemented system processes legal research questions posted to a legal database. In some implementations, a first user interface (UI) is implemented by code executing in a first processor 150. In some implementations, the UI 101 has an input that receives search criteria in the form of a text prompt from a user. In some implementations, an application program interface (API) 180 is implemented by code executing in a second processor 160. In some implementations, the API has an input for receiving the search criteria from the UI 101. In some implementations, the API has an output for outputting the search criteria so received. In some implementations, the UI 150 and the API 180 communicate with each other over an electronic connection.

In some implementations, an instruction base 301 operates on text prompts provided to expand the text prompts into snippets usable by a machine learning network. In some implementations, the snippets define a search to be applied to the legal database. In some implementations, a machine learning network 307 exists within the system. In some implementations, a transformation module comprises code executing in a third processor. In some implementations, the transformation module responds to the search criteria received from the API. In some implementations, the transformation module provides the search criteria to the instruction base.

In some implementations, the instruction base 301 defines the search to be applied to the legal database 215. In some implementations, the received search criteria 213 is processed through a transformation module 305. In some implementations, the processing includes tokenizing 401 the normalized text into smaller units. In some implementations, the processing includes recognizing and tagging specific legal terms or phrases within the tokens 213. In some implementations, the processing includes converting the tokens into embeddings. In some implementations, the embeddings are detailed representations using an instruction base. In some implementations, the embeddings are formatted to be compatible with the machine learning network 307.

In some implementations, non-transitory computer memory is connected so as to receive an output from the legal database 104 in response to the search criteria applied to the instruction base. In some implementations, a second UI 110 is implemented by code executing in the first processor. In some implementations, the second UI 110 provides an interactive interface. In some implementations, the second UI 110 includes code that configures the interface to provide the user with the output included in the memory. In some implementations, the second UI 110 receives further input from the user to present details of the results.

In some implementations, the first user interface (UI) 101 includes a feature for the user to define court search criteria 205 by selecting from a list of courts. In some implementations, the first user interface (UI) includes a feature for the user to define the time range search criteria 207. In some implementations, the system comprises a database for storing search criteria and corresponding search query identifiers 104. In some implementations, the database 104 is writable by the application program interface (API) 190.

In some implementations, the instruction base 301 is configured to create the search query identifier upon receipt of search criteria from the user interface (UI) (203, 205, 207). In some implementations, the identifier is associated with search criteria within the database 215. In some implementations, the machine learning network utilizes large language models (LLMs) 209. In some implementations, the LLMs 209 generate Boolean keyword searches 213 based on the text prompts provided to the instruction base.

In some implementations, the system comprises a search results interface 120 connected with the non-transitory computer memory. In some implementations, the interface is configured to display search criteria 221 and results organized by relevance score. In some implementations, the interface has interactive elements for users to adjust relevance score thresholds. In some implementations, the system includes code for generating a detailed error report in the event of a failed search operation. In some implementations, the report is savable in the non-transitory computer memory.

In some implementations, the machine learning network 223 is configured to evaluate returned case law documents. In some implementations, the network generates a relevance score and summary explanation. In some implementations, the network 223 aligns the substance of case law 221 with the textual content of the search criteria 203. In some implementations, the search results interface 120 groups search results by keyword pairings. In some implementations, the interface 120 orders cases both by relevance score and the frequency of case citations.

In some implementations, a method for processing legal research questions in a computer-implemented environment exists. In some implementations, the method includes receiving search criteria via a user interface (UI) 150. In some implementations, the code for receiving is executed on a processor. In some implementations, the search criteria 203 are in the form of a text prompt from a user. In some implementations, the method includes transmitting the received search criteria to an application program interface (API) 190 via an electronic connection.

In some implementations, the method includes expanding the text prompts 304 into snippets by an instruction base. In some implementations, the snippets are suitable for use by a machine learning network. In some implementations, the method includes defining a search 213 to be applied to a legal database 215. In some implementations, the method includes processing the search criteria through a transformation module 305. In some implementations, the transformation module comprises code executing in the processor 160.

In some implementations, the method includes triggering a search operation by the API 180 upon receipt of the search criteria 501 (legal description 203, court filters 205, and time ranges 207). In some implementations, the method includes receiving a search result output from the legal database 215 in response to the search operation. In some implementations, the search result output is received at a non-transitory computer memory.

In some implementations, the method includes providing the search result to a user through a second UI 110. In some implementations, the second UI 110 includes an interactive interface. In some implementations, the UI 150 is configured to display the search result from the memory. In some implementations, the method includes organizing the cases by a relevance score within the displayed search results.

In some implementations, receiving search criteria via a UI 101 includes capturing court-specific criteria 205. In some implementations, the criteria are selected by the user from a predefined list of courts. In some implementations, capturing the court-specific criteria 205 includes the option for the user. In some implementations, the user selects from historical search criteria. In some implementations, the criteria are related to the same legal jurisdiction and time range. In some implementations, the court 205 and time range 207 criteria are defined within the legal research prompt 203 and extracted by LLM 211.

In some implementations, the method 102 includes assigning a unique search query identifier to the received search criteria. In some implementations, the method includes storing both in a searchable database 104. In some implementations, the method includes using the unique search query identifier. In some implementations, the identifier is used to retrieve and display past search criteria 110 and results 120. In some implementations, the display is through a search results UI 150.

In some implementations, the machine learning network comprises at least one large language model (LLM). In some implementations, the LLM 209 is configured to generate Boolean keyword searches. In some implementations, the searches are based on the expanded text prompts 304. In some implementations, the method includes filtering returned search results. In some implementations, the results are filtered based on additional court filters 205 or time range filters 207. In some implementations, the filters are generated by an LLM 211 from the received search criteria 203.

In some implementations, filtering includes applying court filters 205. In some implementations, the filters 205 are extracted automatically from the text prompt by the LLM 211. In some implementations, the extraction occurs without user specification. In some implementations, the method includes scoring returned case law documents 223. In some implementations, the documents are scored based on their relevance to the text prompt 223. In some implementations, the scoring uses an LLM 223. In some implementations, the method includes organizing the search results by score in descending order 120.

In some implementations, the method includes generating a summary for each scored case law document 223. In some implementations, cases with higher relevance scores receive longer, more detailed summaries 227.

The systems and methods described herein have been indicated in connection with flow diagrams that facilitate a description of the principal processes; however, certain blocks can be invoked in an arbitrary order, such as when the events drive the program flow such as in an object-oriented program. Accordingly, the flow diagram is to be understood as an example flow and that the blocks can be invoked in a different order than as illustrated.

The above are only specific implementations of the disclosure and are not intended to limit the scope of protection of the disclosure. Any modifications or substitutes apparent to those skilled in the art shall fall within the scope of protection of the disclosure. Therefore, the protected scope of the disclosure shall be subject to the scope of protection of the claims.

While the disclosure is explained in relation to certain embodiments, it is to be understood that various modifications thereof will become apparent to those skilled in the art upon reading the specification. Therefore, it is to be understood that the disclosure disclosed herein is intended to cover such modifications as fall within the scope of the appended claims.

What is claimed is:

1. A computer-implemented system for processing legal research questions posted to a legal database, comprising:
   a first user interface (UI) implemented by code executing in a first processor having an input that receives search criteria in the form of a text prompt from a user;
   an application program interface (API) implemented by code executing in a second processor having an input for receiving the search criteria from the UI as well as outputting the search criteria so received
      wherein the UI and the API communicate with each other over an electronic connection,
   an instruction base that operates on text prompts provided thereto in order to expand the text prompts into snippets usable by a machine learning network to define a search to be applied to the legal database;
   a machine learning network;
   a transformation module comprising code executing in a third processor which responds to the search criteria received from the API to provide the search criteria to the instruction base,
      wherein the instruction base defines the search to be applied to the legal database;
      wherein the received search criteria is processed through a transformation module,
   non-transitory computer memory connected so as to receive an output from the legal database in response to the search criteria applied to the instruction base; and
   a second UI implemented by code executing in the first processor,
      wherein the second UI provides an interactive interface and includes code implemented in the first processor that configures the second interface to provide the user with the output included in the memory and to receive further input from the user to present details of the results.

2. The system of claim 1, wherein the first user interface (UI) further includes a feature for the user to define court search criteria by selecting from a list of courts.

3. The system of claim 2, wherein the first user interface (UI) further includes a feature for the user to define the time range search criteria.

4. The system of claim 1, wherein the system further comprises a database for storing search criteria and corresponding search query identifiers, said database being writable by said application program interface (API).

5. The system of claim 4, wherein the instruction base is configured to create the search query identifier upon receipt of search criteria from the user interface (UI) and to associate said identifier with search criteria within the database.

6. The system of claim 1, where the machine learning network utilizes large language models (LLMs) to generate Boolean keyword searches based on the text prompts provided to the instruction base.

7. The system of claim 1, further comprising a search results interface connected with said non-transitory computer memory, configured to display search criteria and results organized by relevance score, with interactive elements for users to adjust relevance score thresholds.

8. The system of claim 1, further comprising code for generating a detailed error report in the event of a failed search operation, said report being savable in the non-transitory computer memory.

9. The system of claim 1, wherein said machine learning network is configured to evaluate returned case law documents by generating a relevance score and summary explanation, aligning the substance of case law with the textual content of the search criteria.

10. The system of claim 7, wherein the search results interface is further configured to group search results by keyword pairings and order cases both by relevance score and the frequency of case citations.

11. A method for processing legal research questions in a computer-implemented environment, comprising the steps of:

receiving, via a user interface (UI) and implemented by code executing on a processor, search criteria in the form of a text prompt from a user;

transmitting the received search criteria to an application program interface (API) via an electronic connection;

expanding, by an instruction base, the text prompts into snippets suitable for use by a machine learning network to define a search to be applied to a legal database;

processing the search criteria through a transformation module that provides the search criteria to the instruction base wherein the transformation module comprises code executing in the processor;

triggering, by the API upon receipt of the search criteria, a search operation by the machine learning network within the legal database using the defined search;

receiving, at a non-transitory computer memory, a search result output from the legal database in response to the search operation;

providing the search result to a user through a second UI, wherein said second UI includes an interactive interface configured to display the search result from the memory; and organizing, within the displayed search results, the cases by a relevance score.

12. The method of claim 11, wherein the step of receiving search criteria via a UI further includes capturing court-specific criteria selected by the user from a predefined list of courts.

13. The method of claim 12, wherein capturing the court-specific criteria includes the option for the user to select from historical search criteria related to the same legal jurisdiction and time range.

14. The method of claim 11, further comprising assigning a unique search query identifier to the received search criteria and storing both in a searchable database.

15. The method of claim 14, further comprising using the unique search query identifier to retrieve and display past search criteria and results through a search results UI.

16. The method of claim 11, wherein the machine learning network comprises at least one large language model (LLM) configured to generate Boolean keyword searches based on the expanded text prompts.

17. The method of claim 11, further comprising filtering returned search results based on additional court filters or time range filters generated by an LLM from the received search criteria.

18. The method of claim 17, wherein filtering includes applying court filters extracted automatically from the text prompt by the LLM without user specification.

19. The method of claim 11, further comprising the step of scoring returned case law documents based on their relevance to the text prompt using an LLM and organizing the search results by score in descending order.

20. The method of claim 19, further comprising generating a summary for each scored case law document, where cases with higher relevance scores receive longer, more detailed summaries.

* * * * *